United States Patent
Hurley et al.

(10) Patent No.: US 6,891,909 B2
(45) Date of Patent: May 10, 2005

(54) PRO-ACTIVE ANTENNA SWITCHING BASED ON RELATIVE POWER

(75) Inventors: James Patrick Hurley, Waukesha, WI (US); Ralph Thomas Hoctor, Saratoga Springs, NY (US)

(73) Assignee: GE Marquette Medical Systems, Inc., Waukesha, WI (US)

( * ) Notice: Subject to any disclaimer, the term of this patent is extended or adjusted under 35 U.S.C. 154(b) by 826 days.

(21) Appl. No.: 09/795,541

(22) Filed: Feb. 28, 2001

(65) Prior Publication Data

US 2002/0118780 A1 Aug. 29, 2002

(51) Int. Cl.[7] ................................................ H04L 1/02
(52) U.S. Cl. ...................... 375/347; 375/267; 455/277.1
(58) Field of Search .............................. 375/267, 346, 375/347, 348, 349, 316; 455/269, 272, 277.1, 277.2, 278.1, 132, 133, 134, 135; 370/500, 509, 510, 512, 513

(56) References Cited

U.S. PATENT DOCUMENTS

| | | | | |
|---|---|---|---|---|
| 5,625,885 A | * | 4/1997 | Nakazawa et al. | ......... 340/7.22 |
| 5,710,995 A | * | 1/1998 | Akaiwa et al. | .......... 455/277.2 |
| 5,781,592 A | * | 7/1998 | Masuda | ...................... 375/347 |
| 5,960,336 A | * | 9/1999 | Ikawa et al. | ............. 455/277.2 |
| 6,477,213 B1 | * | 11/2002 | Miyoshi et al. | ............. 375/347 |
| 6,622,013 B1 | * | 9/2003 | Miyoshi et al. | .......... 455/277.2 |
| 6,738,439 B1 | * | 5/2004 | Okanoue et al. | ............ 375/347 |

* cited by examiner

Primary Examiner—Bocure Tesfaldet
Assistant Examiner—Khanh Tran
(74) Attorney, Agent, or Firm—Ostrager Chong Flaherty & Broitman P.C.

(57) ABSTRACT

A system and a method for switching antenna fields without waiting until data packets containing errors are detected. This is accomplished by monitoring the signal power for each antenna field immediately after receipt of data packets via the currently active antenna field and then switching to another antenna field having greater signal power. A communications channel is provided which has a capacity greater than that required by the data to be transmitted. This extra capacity is used to introduce time periods when no data is being transmitted. During these time periods, known bit patterns are transmitted, and the signal power during receipt of each of these blank packets is estimated for each antenna field. The receiver then switches to the most appropriate antenna field based on highest signal power (e.g., based on a weighted average for the N-th most recent sample periods) and continues to receive the transmitted data without interruption.

8 Claims, 3 Drawing Sheets

··· | DP118 | DP119 | BP 0 | BP 1 | BP 2 | BP 3 | BP 4 | DP 0 | DP 1 | ···

PRO-ACTIVE ANTENNA SWITCHING BASED ON RELATIVE POWER

FIELD OF THE INVENTION

This invention generally relates to systems and methods for wireless communication between mobile units and a stationary central office or station. In particular, the invention relates to systems and methods for wireless transmission of data from mobile data acquisition units to a stationary central receiver.

BACKGROUND OF THE INVENTION

Multipath fading is a well-known problem that affects many RF communications systems. Fading occurs when multiple, out-of-phase versions of a narrowband RF transmission arrive at the receive antenna simultaneously, usually as a result of multiple reflections of the transmission. These out-of-phase received signals, when combined, will at least partially cancel each other, thereby reducing the strength or amplitude of the received signal. This problem is especially acute for indoor communications systems because of the large number of reflections that can occur in the indoor environment.

Another effect observed in the indoor propagation environment is shadowing. This is caused by blockage of the RF propagation by a large obstruction, and it results in lowering of the mean received signal power. Shadowing is a longer-lived phenomenon than fading. While a deep fade experienced by a moving transmitter might last for milliseconds, shadowing might last for seconds.

One indoor communications system in which fading and shadowing can occur is a system for wireless monitoring of patients in a hospital or other health care facility. In one known wireless remote patient monitoring system, each monitored patient is coupled to a portable patient monitor. Each patient monitor has a transmitting antenna for sending acquired patient monitoring data to a central receiver. To overcome the fading problem, the receiver uses both extra transmit power, known as a fade margin, and a spatial diversity antenna scheme, which is one of several well-known solutions to the problem of multipath fading. This spatial diversity scheme uses four separate antenna fields, each extending throughout the coverage area. When patient monitoring data is being lost due to a low received signal level on one antenna field, the system can switch to a different field that has a higher received signal level.

In the known wireless patient monitoring system described above, a multiplicity of receivers are provided to enable concurrent remote monitoring of a multiplicity of patients. Each receiver can monitor a single antenna field while receiving and demodulating the incoming signal from a single patient. A patient who is being remotely monitored using such a system may move about the hospital freely. The patient's motion causes variations in signal level through fading, shadowing and changes in the closest line-of-sight distance from the patient's transmitter to the nearest antenna of each of the four antenna fields. These variations in signal level make it advantageous for the receiver to switch between antenna fields as the patient moves, so as to maximize the received signal power. Some method of determining the best antenna field to use is required, and this method must be applied over and over again to deal with the effects of patient mobility.

In the known wireless patient monitoring system described above, the incoming signal is structured as a sequence of packets or frames, and the receiver must wait until it starts receiving packets containing errors to determine when to change antenna fields. This results in lost data due to reception errors, alternate antenna field testing, and antenna switching time. For changes in received signal level caused by shadowing or by movement from a position near an antenna of one antenna field to a position closer to an antenna of a second field, the need to switch can be predicted before bit errors start to occur. This prediction can be made based on measured average received signal power over some period of time. The errors in the known system described above are due to the fact that now such prediction is not attempted. Such prediction is not possible in the known system because incoming monitoring data consumes all the bandwidth of the channel.

It would be advantageous to design a technique that could determine when to switch antenna fields without waiting for packets that contain errors. Such a method would eliminate the loss of data due to antenna field switching.

SUMMARY OF THE INVENTION

The present invention is directed to a system and a method for switching antenna fields without waiting until data packets containing errors are detected. This is accomplished by monitoring the signal power for each antenna field immediately after receipt of data packets via the currently active antenna field and then switching to another antenna field having greater signal power, even though error-free data packets had been received via the previous antenna field.

In accordance with the preferred embodiments of the invention, a communications channel is provided which has a capacity greater than that required by the data to be transmitted. This extra capacity is used to introduce time periods when no data is being transmitted. During these time periods, known bit patterns (hereinafter referred to as "blank packets") are transmitted, and the signal power during receipt of a respective blank packet is estimated for each of a plurality of antenna fields. The receiver then switches to the most appropriate antenna field based on highest signal power (e.g., based on a weighted average for the N-th most recent sample periods) and continues to receive the transmitted data without interruption.

In accordance with one preferred embodiment of the invention, the number of time periods during which blank packets are transmitted is equal to (M+1), where M is the number of antenna fields. The signal power for the first antenna field is calculated during transmission of the first blank packet; the signal power for the second antenna field is calculated during transmission of the second blank packet; and so forth. At least one additional blank packet is transmitted to allow synchronization without data loss following switching to a new antenna field. However, it should be appreciated that the invention is not limited to having a number of blank packets one greater than the number of antenna fields. It need not take exactly one frame or packet time to estimate the power on a given antenna field. Instead the required number of blank packets is determined by computing M times the time required to measure power on a given antenna field, plus the time required to re-synchronize to the selected antenna field, rounded up to an integer number of packet times.

In accordance with the preferred embodiment, the transmitted data is acquired by a portable patient monitor in a hospital or other health care facility. For example, the acquired data may be an electrocardiogram (ECG) record comprising ECG waveforms acquired using multiple (e.g., 5) leads. However, the present invention is not limited to use in the patient monitoring environment, but rather has application in any RF communications system.

DETAILED DESCRIPTION OF THE PREFERRED EMBODIMENTS

Figure 1:
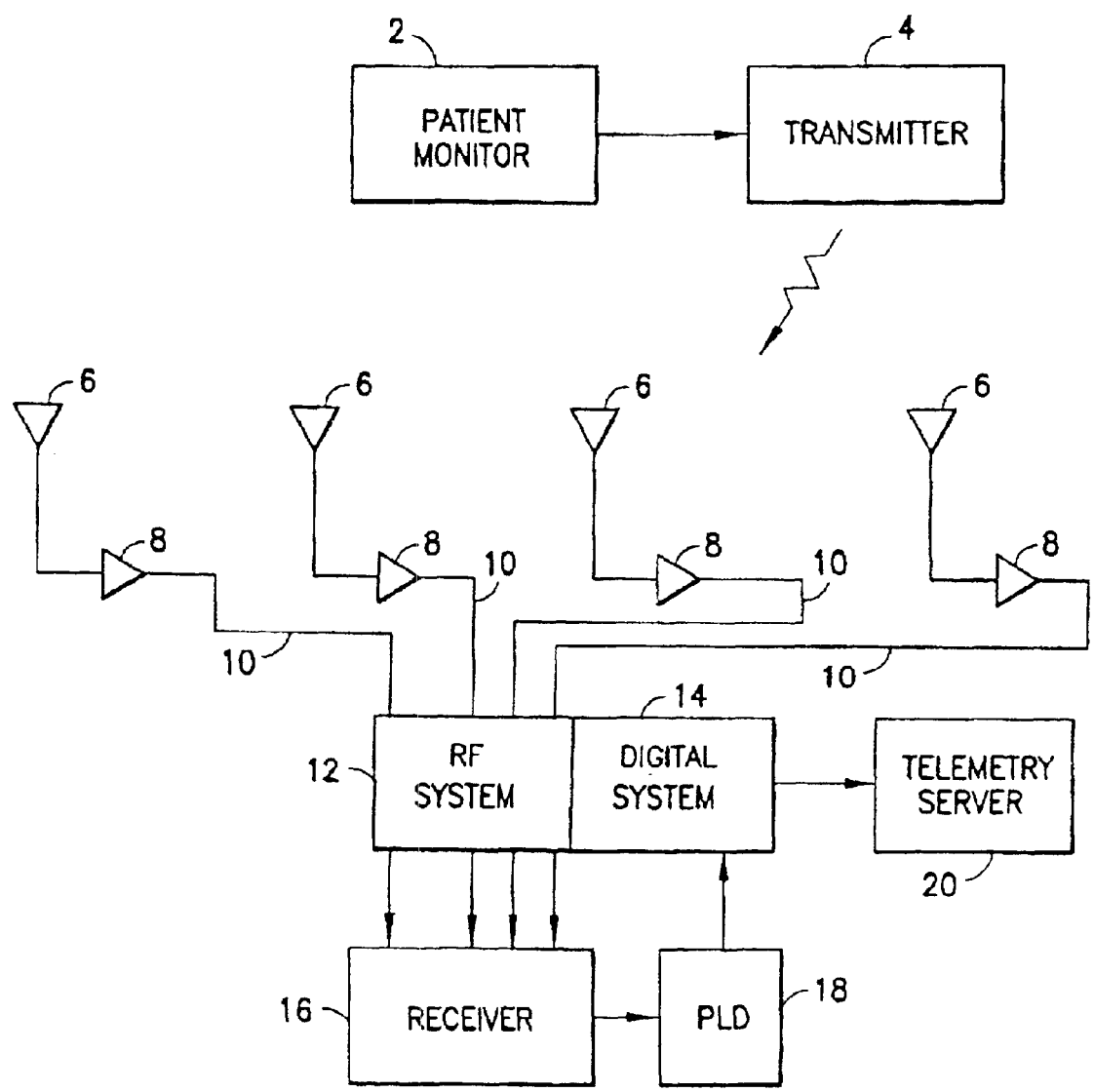
FIG. 1 is a block diagram showing a system for wireless communication between a portable transmitter and a stationary receiver coupled to a plurality of antenna fields in accordance with the preferred embodiment of the invention.

In accordance with the preferred embodiment of the invention shown in FIG. 1, a multiplicity of patients in a hospital can be remotely monitored using portable patient monitors, each patient monitor 2 having an antenna and a transmitter 4 for transmitting acquired patient monitoring data to a central receiving office or station via a plurality of receiving antennas 6.

In one exemplary implementation of the preferred embodiment, the hospital area is covered by four overlapping antenna fields (one for each of antennas 6 shown in FIG. 1) which are ganged to the same central receiving office or station. Each antenna field is coupled to a receiver subsystem via a respective antenna amplifier 8 and coaxial cable 10. As shown only generally in FIG. 1, the receiver subsystem comprises an RF system 12 and a digital system 14. The receiver subsystem provides an interface between individual receiver modules 16 (only one of which is depicted in FIG. 1) and a telemetry server 20 connected to the receiver subsystem via a programmable logic device 18 (which interfaces the receiver 16 to the digital system 14) and an Ethernet network (which connects the digital system 14 to the telemetry server 20). The RF system 12 also performs the initial amplification and filtering necessary on the RF input signals from the antenna system.

In an exemplary implementation, each transmitter 4 acquires ECG data, which is filtered and transmitted to the receiver at a rate of 120 samples per second. Each transmitter sends the data out at a rate of 10 Kbps in a protocol which specifies 125 packets per second. Each packet contains one of the 120-Hz samples acquired by the transmitter. This means that only 120 of the 125 packets per second are required to transmit the acquired data and that the remaining packets may contain no data. The protocol specification, in accordance with the preferred embodiment, requires that these five remaining packets contain no data and dubs them "blank packets". Blank packets have unique identifiers, are grouped together in time, and are periodic. The foregoing specific sample and packet rates are merely exemplary. Other rates could be substituted provided that the packet rate exceeds the sample rate.

In accordance with the preferred embodiment of the invention, after the receiver 16 receives its first blank packet, it estimates the time to the next group of blank packets. In general, estimation of the required interval, as opposed to certain knowledge of that interval, is required because of pipeline delays in the receiver, the values of which need not be constant. After the estimated time elapses, the receiver stops demodulating the incoming signal and instead switches through all of the antenna fields, estimating the signal power for each. Finally, e.g., during receipt of the last blank packet, the receiver switches 16 to the most appropriate field as determined by these signal power estimates and begins demodulating the signal before the blank packet time expires. If antenna coverage is adequate, each receiver can switch antenna fields while the corresponding patient roams throughout the hospital without loss of data by using pro-active antenna switching.

Figures 2, 4:
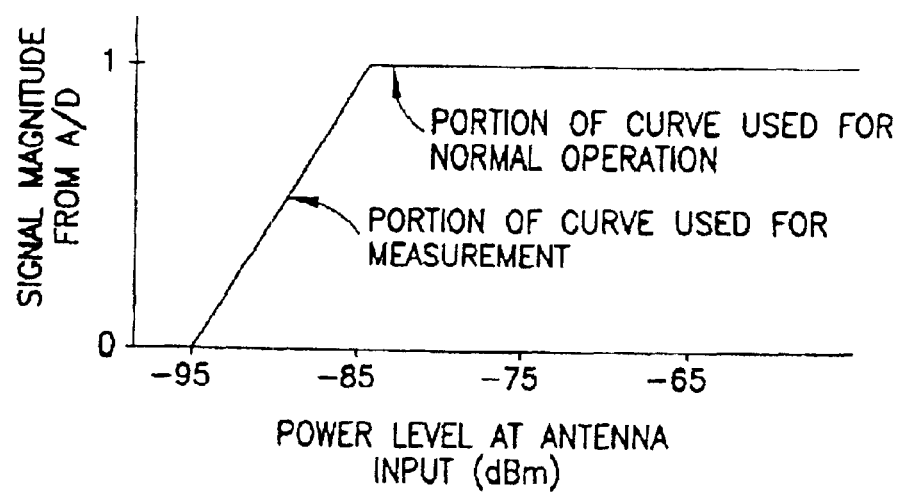
FIG. 2 is a schematic showing the timing of packets transmitted in accordance with the preferred embodiment of the invention.
FIG. 4 is a graph depicting in an idealized manner the relationship between the amplitude of the digitized signal and the power level at the antenna input (in dBm).

FIG. 2 shows the relationship of the string of blank packets to the stream of data packets assuming the example where the number of antenna fields M=4. The blank packets are labeled BP0 through BP4 and occur consecutively without intervening data packets; the data packets are labeled DP0 through DP119. The burst of five blank packets occurs once per second and the time interval during which blank packets are received is used to perform antenna power level testing, i.e., to calculate relative antenna field power.

In accordance with one implementation, the receiver subsystem is a printed circuit board which allows up to four quad receiver modules (i.e., cards) to be installed. Each quad receiver module, in turn, comprises four receivers. Each receiver receives ECG data from a different patient monitor. However, there is no requirement that the invention be used in systems having multiple receivers. On the contrary, the invention has application in a solitary receiver as well as systems having multiple receivers. Nor is the invention restricted to use in telemetry of patient monitoring data.

Figure 3:
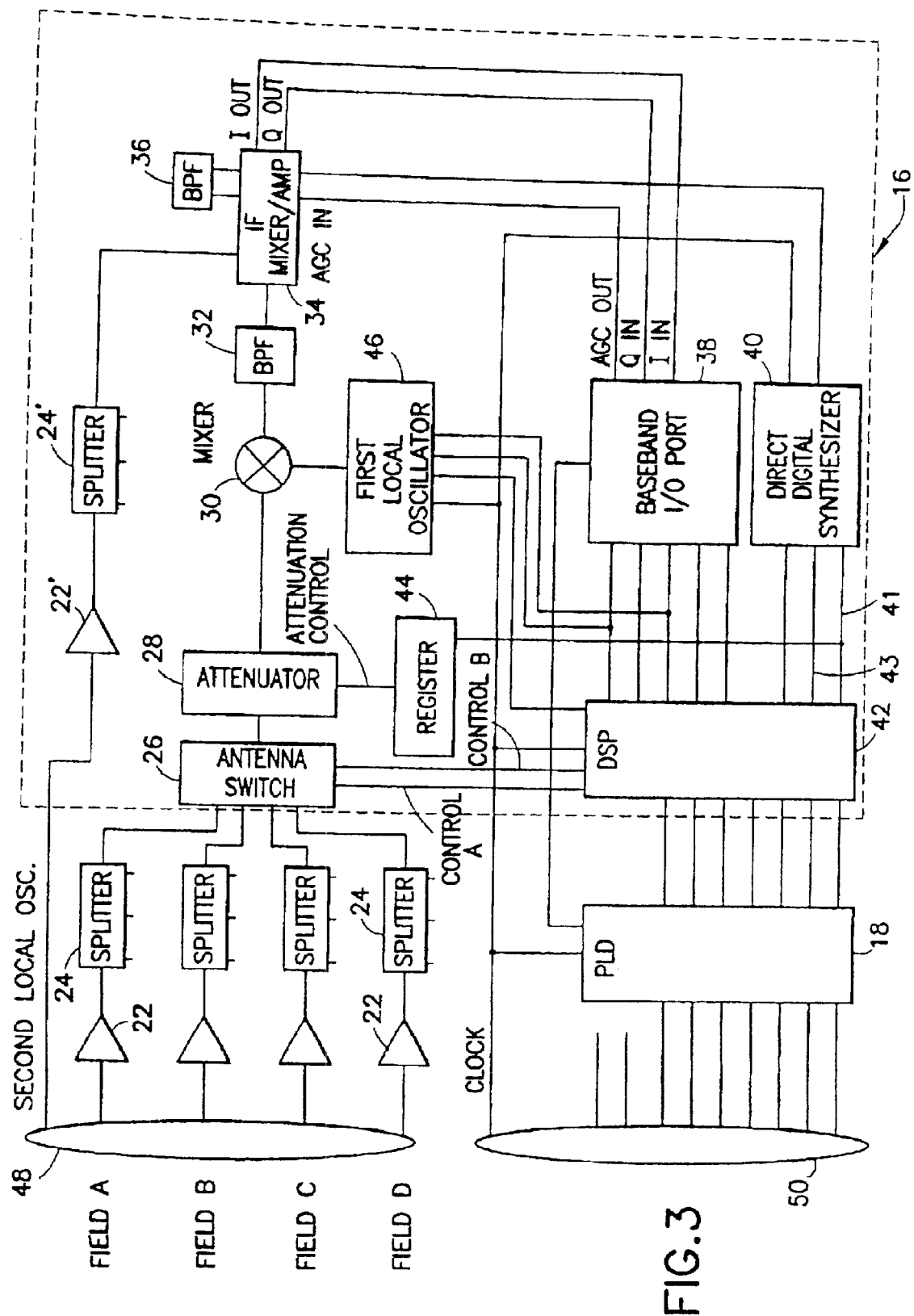
FIG. 3 is circuit diagram generally depicting the circuitry of a single receiver in accordance with the preferred embodiment of the invention.

FIG. 3 shows portions of the circuitry of a quad receiver module in accordance with the preferred embodiment of the invention. The quad receiver module comprises four receivers, only one of which is shown in FIG. 3. This receiver is indicated by the dashed rectangle 16. The quad receiver module circuit board assembly receives GMSK-modulated RF signals from the transmitter 4 through RF system 12 of the receiver subsystem (see FIG. 1). In the receiver 16, the RF signals are mixed to an intermediate frequency by mixer 30, filtered by a bandpass filter 32, and mixed again to baseband by IF mixer/amplifier 34 and re-filtered by a bandpass filter 36. The baseband signal is separated into its in-phase (I) and quadrature (Q) components by the IF mixer/amplifier 34, and then the I and Q components are sampled by a baseband input/output (I/O) port 38. A digital signal processor (DSP) 42 takes the samples, demodulates, corrects, and decodes packets of data. The information is passed via a programmable logic device 18 on to the receiver subsystem for further processing and transport over the Ethernet. Each quad receiver module has four functionally identical receivers 16.

The RF system is responsible for amplifying, filtering, and frequency converting to baseband the received signal from the transmitter. This frequency-converted signal is then sampled by the digital system portion of the quad receiver module and demodulated.

Still referring to FIG. 3, the RF system consists of four antenna low-noise amplifiers 22, the second local oscillator amplifier 22' and four functionally identical receivers 16 (only one of which is depicted). The four antenna amplifiers 22 amplify and distribute each of the four antenna fields A-D to the four receivers on the module. The second local oscillator amplifier 22' distributes the second local oscillator signal.

Each of the four functionally identical receivers recovers transmitted information from one transmitter. The remainder of the RF system description will describe one instance of the RF portion of each of the four receivers.

The low-noise antenna amplifiers 22 amplify the four antenna fields found on the connector 48. The amplifiers are low noise to minimize the additive noise and high enough gain to offset circuit losses after the amplifiers.

The antenna splitters 24 split each RF antenna field into four identical signals for use by each of the four receivers on the card. The splitters 24 are passive devices that use transformers optimized to split the input signal four ways while minimizing the loss.

The second local oscillator amplifier 22' and splitter 24' amplifies and splits to each receiver 16 the second local oscillator signal (generated by the receiver subsystem) found on the connector 48. The amplifier 22' is a low-noise amplifier to minimize the amount of additive noise to the second local oscillator signal. This provides the second local oscillator reference for the second IF mixer/amplifier 34 (described below).

An antenna switch 26 is used by the receiver 16 to select one of the four antenna field inputs as the input signal source for the receiver. The switch is designed using FET logic. Two control lines (A and B) from the digital signal processor 42 control which of the four input antenna signals are active.

A digitally controlled attenuator 28, having an input connected to the output of the antenna switch 26, is used to attenuate the input RF signal to protect the mixer 30 from strong signal overload. In addition, the attenuator 28 is used by the antenna switching algorithm to determine the relative power levels of the four antenna field inputs. The attenuator 28 is designed using FET logic. The digital signal processor 42 sets the level of attenuation by writing a digital word to the register 44. One control line from the register 44 controls the attenuator 28.

The first IF mixer 30 converts the input RF signal to the first IF frequency. The mixer 30 combines the input RF signal with the signal output by the first local oscillator 46 to generate the first IF frequency from the difference between the input RF signal and the first local oscillator. The first IF bandpass filter 32 is used to reject the unwanted spurious signals generated from the first IF mixer 30 and an image frequency for the second IF mixer 34. The filter 32 passes the first IF frequency with a bandwidth of ±15 kHz so no distortion of the desired IF signal occurs. The filter is designed to have low loss and a narrow bandwidth using quartz SAW filter technology.

The first local oscillator 46 is used as an input to mixer 30 to convert the input RF signal to the first IF frequency. The first local oscillator consists of a voltage-controlled oscillator, a frequency synthesizer, and a loop filter (not shown).

The second IF mixer/amplifier 34 converts the signal from the first IF bandpass filter 32 to the second IF frequency. After conversion, the signal is filtered by the second bandpass filter 36 and amplified. After amplification the signal is converted to baseband I and Q data and output to the I/Q analog-to-digital converter (ADC) incorporated in the baseband I/O port 38.

The second IF mixer 34 converts the input IF frequency to the second IF frequency by mixing with the second local oscillator from splitter 24'. The second local oscillator signal is generated on the receiver subsystem and is a synthesized signal having a fixed frequency.

The amplifier section of chip 34 amplifies the second IF signal to create the proper levels for input to the demodulator section. The amount of amplification is determined by the AGC voltage, controlled by the AGC digital-to-analog converter (DAC), which is also incorporated in the baseband I/O port 38.

A direct digital synthesizer 40 is used as the demodulator reference. The demodulator reference is combined with the second IF signal in the demodulator section of the IF mixer/amplifier chip 34 to generate the I and Q data signals.

The digital system is responsible for sampling, demodulating, correcting and decoding GMSK-modulated data from a transmitter. The digital system is also responsible for controlling a number of RF system functions. Antenna switching, frequency synthesizer programming, and attenuation control are some of those functions. Once the system has recovered the transmitted information, the system passes the data to the receiver subsystem for further processing.

As previously mentioned, there are four functionally identical receivers on one quad receiver module. The quad receiver module card is the funnel that combines the information from all the receivers to interface with just one digital port 50. The remainder of the digital system will be described for one instance of the four receivers.

The main component of the receiver 16 is the DSP 42. The preferred DSP device has an arithmetic logic unit (ALU); a separate 16-bit data and address bus; a dual-port RAM with host port interface; and an on-chip PLL clock generator. The system has no additional program or data memory other than the memory internal to the DSP. The DSP 42 is accessed by the receiver subsystem through the host port interface (HPI). The HPI provides a window into a section of the DSP's internal RAM. The HPI data bus is 8 bits wide and separate from the processor's external data bus.

The DSP's address bus 43 and data bus 41 are used to map the programmable logic device (PLD) 18 and the direct digital synthesizer 40 to the external memory address space. The DSP 42 is reset by a control line from PLD 18. There are two buffered serial ports provided by the DSP. Only one is used. It is connected to the I/Q ADC and AGC DAC of chip 38 to: retrieve I/Q sampled data, program the devices and adjust the AGC.

As previously noted, the baseband I/O port 38 provides two high-speed ADCs, one for the in-phase (I) and one for the quadrature (Q) component of the baseband signal. The samples are then filtered by an FIR filter. This device 38 also contains an auxiliary DAC, which is used for automatic gain control on the IF mixer/amplifier 34. The DAC has an output voltage which is fed into the IF mixer/amplifier gain control input. The lower the voltage on this line, the greater the gain.

The direct digital synthesizer (DDS) 40 is a numerically controlled oscillator. The DDS 40 generates the demodulation clock for the final demodulation stage that brings the RF signal to baseband. The DDS 40 is connected to the DSP's data bus 41.

The DSP 42 controls the RF attenuator 28, programming of the frequency synthesizer incorporated in the first local oscillator 46 and antenna field switching 26.

As previously described, a communications channel is provided which has a capacity greater than that required by the data to be transmitted. This extra capacity is used to introduce time periods when blank packets, containing no data, are transmitted. During these time periods, the signal power during receipt of a respective blank packet is estimated by the DSP 42 for each of a plurality of antenna fields. The receiver 16 then switches to the most appropriate antenna field based on highest signal power (e.g., based on a weighted average for the N-th most recent sample periods) and continues to receive the transmitted data without interruption. In accordance with the preferred embodiment of the invention, after the receiver 16 receives its first blank packet, the DSP 42 estimates the time to the next group of blank packets. After the estimated time elapses, the DSP 42 stops demodulating the incoming signal and instead causes the antenna switch 26 to switch through all of the antenna fields, estimating the signal power for each. Finally, e.g., during receipt of the last blank packet, the DSP 42 switches the antenna switch 26 to the most appropriate field as determined by these signal power estimates and begins demodulating the signal before the blank packet time expires. If antenna coverage is adequate, each receiver can switch antenna fields while the corresponding patient roams throughout the hospital without loss of data by using pro-active antenna switching.

In accordance with the preferred embodiment, the digital signal processor 42 is programmed to calculate the relative power for each antenna field using the following algorithm:

(1) The antenna field switch 26 is set to pass the signal from the antenna under test. As previously described, that signal comprises a sequence of blank packets having a known bit pattern. The known bit pattern need not be the same for each blank packet.

(2) The attenuator 28 is set by DSP 42 to provide a level of attenuation, e.g., 20 dB, which puts the received signal in the "linear" range (shown in idealized form in FIG. 4) of the RF amplifiers in the IF/mixer/amplifier block. The linear range of the RF amplifiers is typically very close to the receiver sensitivity. By adding 20 dB of attenuation, the switching decision can take place with 10–20 dB of signal margin over the sensitivity of the receiver.

(3) When the antenna field is switched, transient behavior in the downstream bandpass filter can occur. The DSP 42 is programmed to wait for the signal settling time to transpire.

(4) After the signal settling time has transpired, I and Q samples for 10-bit-long time intervals are acquired by the DSP 42. For example, for a data rate of 10 Kbps, a 10-bit interval is 1 msec. Each packet is $\frac{1}{125}$ sec, which equals 0.008 sec. The power level is measured during 0.001 sec, which is $\frac{1}{8}$ of the packet length.

(5) All of the acquired I and Q channel samples are squared and then summed by the DSP 42.

(6) The DSP then divides the resulting total by the number of bits (or some other number to get a meaningful scaled value).

(7) Steps (4)–(6) are repeated four times, adding each result to the total calculated power. (The number of repetitions need not equal four, but needs to be the same for each antenna field because the measurement is relative, not absolute.)

(8) Steps (3)–(7) are performed for each antenna field, once every second, i.e., the power level is determined every second for each antenna field. A weighted average of the power levels is calculated for each antenna field for the last three seconds to determine which antenna field currently is best. The field with the highest weighted average is used for the active field for continued demodulation when reception of data packets resumes in the next cycle. The equation for the weighted average power is:

$$P_w = 2P_{current} + P_{(current-1)} + P_{(current-2)}$$

The weighted average is used because it was observed that the instantaneous power measurement varies considerably from measurement to measurement, even with a stationary transmitter. The weighted average attempts to minimize the noise in the measurement by including the previously measured antenna field powers, but it emphasizes the current power measured for the antenna field.

The above-described technique of changing antenna fields as a function of measured power is preferably used in conjunction with the prior art technique of changing antenna fields in response to observed bit errors.

While the invention has been described with reference to preferred embodiments, it will be understood by those skilled in the art that various changes may be made and equivalents may be substituted for elements thereof without departing from the scope of the invention.

In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A method of wireless communication, comprising the following steps:

(a) acquiring first through N-th packets of data at a remote site;

(b) transmitting said N packets of data from an antenna at said remote site in the form of modulated signals, each modulated signal having a bit pattern dictated by the acquired data;

(c) receiving at least portions of said modulated signals of said N packets of data in first and second antenna fields;

(d) demodulating said portions of said modulated signals of said N packets of data detected in said first antenna field;

(e) after transmitting said N-th packet of data, transmitting an (N+1)-th packet from said antenna at said remote site, said (N+1)-th packet being transmitted in the form of a modulated signal having a known bit pattern not dictated by the acquired data;

(f) receiving at least a portion of said modulated signal of said (N+1)-th packet in said first antenna field;

(g) calculating the power of said modulated signal of said (N+1)-th packet from said first antenna field;

(h) after transmitting said (N+1)-th packet, transmitting an (N+2)-th packet from said antenna at said remote site, said (N+2)-th packet being transmitted in the form of a modulated signal having a known bit pattern not dictated by the acquired data;

(i) receiving at least a portion of said modulated signal of said (N+2)-th packet in said second antenna field;

(j) calculating the power of said modulated signal of said (N+2)-th packet from said second antenna field; and (k) selecting one of said first and second antenna fields to provide detected modulated signals for demodulating subsequent to transmission of said (N+2)-th packet, the results of said selecting step being a function of the results of said calculating steps.

2. The method as recited in claim 1, wherein steps (a) through (j) are repeated at least two times, the results of said selecting step being a function of the results of all of said calculating steps.

3. The method as recited in claim 1, wherein said acquiring step comprises monitoring a patient.

4. A communications system comprising:

a transmitter for transmitting modulated signals representing a sequence of data packets followed by a sequence of blank packets every cycle;

a plurality of receive antennas; and a receiver coupled to each of said receive antennas, wherein said receiver comprises:

an antenna switch having an output and a plurality of inputs, each of said inputs being respectively connected to receive a signal derived from a respective modulated signal output by a respective receive antenna upon receipt of a transmitted modulated signal, said antenna switch being settable to pass only a selected one of said inputs to said output;

an attenuator connected to receive a signal output by said antenna switch, said attenuator outputting an attenuated version of said signal in accordance with a settable attenuation level;

a converter for converting each modulated signal output by said attenuator to baseband signal components; and a digital signal processor programmed to perform the following steps:

(a) setting a first attenuation level during receipt of data packets and setting a second attenuation level greater than said first attenuation level during receipt of blank packets during each cycle;

(b) setting said antenna switch to pass a respective blank packet from each of said plurality of receive antennas in a first cycle;

(c) estimating the relative signal power at each of said plurality of receive antennas from said respective blank packets in said first cycle;

(d) setting said antenna switch to pass data packets in a second cycle from a selected one of said plurality of receive antennas based at least in part on the results of said estimating step; and (e) demodulating the baseband signal components derived from data packets passed by said antenna switch during said second cycle.

5. The communications system as recited in claim 4, further comprising a patient monitor which sends patient monitoring data to said transmitter, said data packets containing patient monitoring data and said blank packets not containing patient monitoring data.

6. The communications system as recited in claim 4, wherein said step of estimating comprises computing a respective relative signal power value for each receive antenna which is a function of the estimated relative signal power for the respective receive antenna.

7. The communications system as recited in claim 6, wherein said function is a weighted average of estimated relative signal power computed over a plurality of cycles.

8. The communications system as recited in claim 7, wherein said estimated relative signal power for the current cycle is weighted more heavily than the estimated signal power for any preceding cycle.

* * * * *